(12) United States Patent
Baney et al.

(10) Patent No.: US 6,476,103 B1
(45) Date of Patent: Nov. 5, 2002

(54) PHOTOCHROMIC ORGANIC MATERIAL, ITS MANUFACTURE AND THE PHOTOCHROMIC ARTICLES CONTAINING IT

(75) Inventors: Bruno Baney, Fontainebleau; David Henry, Morigny-Champigny, both of (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/147,862

(22) PCT Filed: Sep. 25, 1997

(86) PCT No.: PCT/US97/17496

§ 371 (c)(1), (2), (4) Date: Mar. 17, 1999

(87) PCT Pub. No.: WO98/16863

PCT Pub. Date: Apr. 23, 1998

Related U.S. Application Data

(60) Provisional application No. 60/030,686, filed on Nov. 13, 1996.

(30) Foreign Application Priority Data

Oct. 11, 1996 (FR) ............................................ 96 12430

(51) Int. Cl.[7] .............................. C08K 5/34; C08K 5/15; C08K 31/00
(52) U.S. Cl. ........................ 524/94; 524/110; 524/287; 524/559; 252/586; 351/162; 525/305; 525/313; 526/219.6; 526/329.2
(58) Field of Search .................... 252/586; 351/162; 525/305, 313; 526/219.6, 329.2

(56) References Cited

U.S. PATENT DOCUMENTS

| | | | |
|---|---|---|---|
| 4,298,519 A | | 11/1981 | Cordes et al. |
| 4,713,244 A | * | 12/1987 | Bawa et al. ................. 424/429 |
| 4,715,999 A | | 12/1987 | Dislich et al. |
| 4,845,011 A | | 7/1989 | Wilczak et al. |
| 4,994,347 A | | 2/1991 | Smothers |
| 5,170,192 A | * | 12/1992 | Pettigrew et al. ........... 351/161 |
| 5,336,743 A | * | 8/1994 | Takaoka et al. .......... 526/292.4 |
| 5,395,566 A | * | 3/1995 | Kobayakawa et al. ...... 252/586 |
| 5,442,022 A | * | 8/1995 | Keita et al. ................. 526/309 |
| 5,708,064 A | | 1/1998 | Coleman et al. |

FOREIGN PATENT DOCUMENTS

| | | |
|---|---|---|
| WO | WO 92/05209 | 4/1992 |
| WO | WO 95/10790 | 4/1995 |
| WO | WO 96/18926 | 6/1996 |

\* cited by examiner

*Primary Examiner*—Kriellion A. Sanders
(74) *Attorney, Agent, or Firm*—Angela N. Nwaneri; Peter Rogalskyj

(57) ABSTRACT

The present invention deals with a novel photochromic organic material, the use of at least one plasticizer for the preparation of said novel material, said preparation and photochromic articles constituted wholly or in part of said novel material. The intervening plasticizer, advantageously a phthalate, is according to a variant simply dispersed in the polymer matrix, or, according to another variant, chemically bound to said polymer matrix. Said novel material possesses remarkable photochromic properties together with interesting optical and mechanical properties.

61 Claims, No Drawings

PHOTOCHROMIC ORGANIC MATERIAL, ITS MANUFACTURE AND THE PHOTOCHROMIC ARTICLES CONTAINING IT

The present application is a 371 of International Patent Application No. PCT/US97/17496, filed Sep. 25, 1997, which claims the benefit of U.S. Provisional patent application Ser. No. 60/030,686, filed Nov. 13, 1996, and French Patent Application No. 96/12430, filed Oct. 11, 1996.

The presently claimed invention deals with:
a novel photochromic organic material;
the use of at least one plasticizer for the preparation of said novel material;
said preparation;
photochromic articles constituted wholly or in part by said novel material.

The implementation of a photochromic ophthalmic lens of plastic material is delicate. Ideally, the polymer matrix of such a lens must be:
thermoreticulated;
exempt from optical distortion in its mass;
suited to receive and to be thermoreticulated in the presence of photochromic coloring agent(s) selected notably from the spiroxazines and the chromenes;
in a way as to generate a material which possesses a high initial transmission before exposure and a significant darkening capacity after exposure, all this with rapid darkening and lightening kinetics and acceptable mechanical properties. Furthermore, the material must also possess a low thermal dependence, a high resistance to fatigue and a refractive index as high as possible . . .

From the prior art, copolymers are known which are convenient for the manufacture of organic spectacle lenses and notably the copolymers desribed in the Application WO-A-92/05209. Said copolymers are obtained by radical polymerization of a first monomer of formula (A):

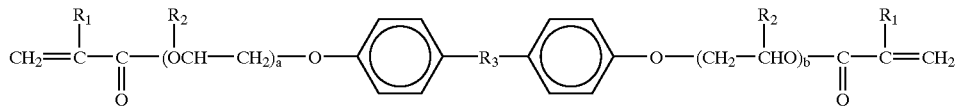

in which a and b are whole numbers from 0 to 4, $R_1$ and $R_2$=H or $CH_3$, $R_3$=—O—, —S—, —CO—, —$SO_2$—, —$CH_2$—, —CH=CH— or —C($CH_3$)$_2$—;
with a second monomer which can consist of styrene or one of its derivatives;.
and, optionally, a third monomer which can be selected from the vinylic aromatic compounds and aromatic methacrylates;
in the presence of an initiator of the peroxide type and a chain transfer agent selected from various brominated compounds.

Such copolymers have had a presentiment of constituting the polymer matrix of photochromic articles.

Nevertheless, when an attempt is made to incorporate photochromic coloring agents into the copolymerizable composition in order to confer photochromic properties to the matrix obtained after copolymerization, it is noticed that said coloring agents are destroyed by the peroxide initiator.

Even if said peroxide initiator is replaced by a gentler radical polymerization initiator, such as a diazo compound such as azo-bis-isobutyronitrile, the material which is obtained is still unsatisfactory since the photochromic coloring agents are inhibited by the brominated chain transfer agent which is used.

It can be envisaged to incorporate further coloring agents in the matrix, notably by a process of specific thermal diffusion. But, the efficiency of such a process of manufacture is debatable and, in any case, this complicates the process of manufacture and adds to the cost of the material.

There is therefore a real need for perfomant photochromic materials which are prepared from an easy and inexpensive process of manufacture.

The Applicant, confronted with this technical problem, has already proposed photochromic organic materials its Patent Applications FR 9508424 and FR 9514343, respectively filed Jul. 12, 1995 and Dec. 5, 1995,these photochromic organic materials having a refractive index of greater than 1.55 and being exempt from optical distortions. These materials, based on at least one monomer of formula (1)

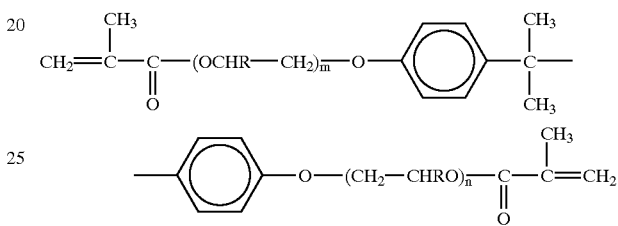

in which R=H or $CH_3$ and m and n are independently 1 or 2, exhibit good photochromic and optical properties. Nevertheless, these compounds can be blamed for not being sufficiently dark in the darkened state, and they also possess darkening and lightening kinetics which are too slow . . .

The novel material, the first subject of the invention, constitutes from this point of view a perfecting of said materials according to FR 9508424 and FR 9514343. It displays generally a faster photochromic response as well as being darker in the darkened state; at the same time as exhibiting suitable mechanical and optical properties. Within the framework of the invention, a novel photochromic material has been perfected with improved photochromic properties, without this improvement of said photochromic properties being obtained at the expense of the mechanical properties. This improvement is based on the intervention of at least one plasticizer in the formulation of the material.

Characteristically, the photochromic organic material of the present invention contains in its structure, more or less bound to said structure, at least one plasticizer.

Said photochromic organic material, which possesses a refractive index of greater than or equal to 1.55 and which is exempt from optical distortions, is a material obtainable by radical polymerization of a composition containing:

(a) at least one monomer of formula (1):

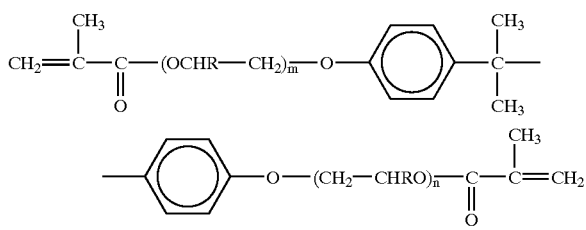

in which R=H or $CH_3$ and m and n are independently 1 or 2;

(b) at least one aromatic monovinylic monomer of formula (II):

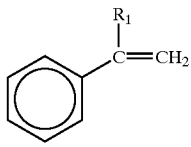

in which $R_1$=H or $CH_3$; said monovinylic monomer consisting advantageously of styrene;

(c) an effective amount of at least one photochromic coloring agent which confers to said material photochromic properties; said coloring agent being selected from the group of spiroxazines, spiropyrans and chromenes;

(d) at least one plasticizer advantageously selected from the phthalates.

Said composition generally further contains an effective amount of at least one chain transfer agent and an effective amount of at least one radical polymerization initiator. It is furthermore susceptible of further containing:

(e) at least one aromatic divinylic monomer of formula (III):

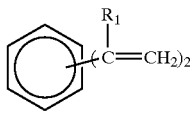

in which $R_1$=H or $CH_3$; said divinylic monomer advantageously consisting of divinylbenzene.

and/or (f) at least one (meth)acrylic monomer of formula (IV):

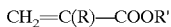

in which R=H or $CH_3$ and R' is a linear or branched alkyl radical having from 4 to 16 carbon atoms, an optionally substituted methylphenyl or methylphenoxy radical or a polyoxyethyloxy group of formula —$(CH_2—CH_2O)_nR''$ in which n is a whole number ranging from 1 to 10 and R''=$CH_3$ or $C_2H_5$;

said (meth)acrylic monomer advantageously consisting of ethylhexylmethacrylate.

and/or an effective amount of at least one non-photochromic coloring agent, with the hypothesis of desiring to confer a base tint to the material.

The nature and quantity of each of the components intervening, or susceptible of intervening, in the composition of the material of the invention will now be examined more in detail.

The monomer(s) (a) of formula (I) are well known and are commercially available. It is noted that this means the first monomers of formula (A) in the sense of the document WO-A-92/05209. The monomer of formula (I) in which R=H and m=n=2 is particularly preferred. Said monomer is notably marketed by Akzo Nobel (NL), under the brand name of Diacryl 121.

The monomers of formula (I) intervene generally in the composition to be polymerized at 50 to 90% by weight. If they intervene in a smaller quantity, the polymerizable composition (or matrix) has a tendence to retract during the polymerization, which induces a premature turning-out from the mould, which, in turn is responsible for a deterioration of the optical properties of the final material. If they intervene in a larger quantity, it is also observed that the final material possesses mediocre optical properties.

The aromatic monovinylic monomers (b) of formula (II)—styrene and/or methylstyrene—intervene in combination with the monomers of formula (D) to slacken the polymer network. The intervention, at this level, of styrene is particularly advantageous insofar as where the polymerized compound possesses a rather high refractive index (n=1.595). Said styrene constitutes the particularly preferred compound of this class of monomers.

Said monomers of formula (II) generally intervene in the composition to be polymerized at 5 to 40% by weight, advantageously at 8 to 30% by weight. If they intervene in a too small a quantity, the anticipated effect at the level of the tensions within the matrix are not observed (birefringence phenomena are observed . . . ); a matrix is also obtained which possesses a low refractive index. If they intervene in too large a quantity, it is observed that the matrix has a tendance to stick to the mould during the polymerization and a decrease in the photochromic properties is also observed ( above all as regards the kinetics).

The materials of the invention, insofar as photochromic materials are concerned, contain furthermore in their matrix an effective quantity of at least one photochromic coloring agent. Said coloring agent is selected from the spiroxazines, the spiropyrans and the chromenes with photochromic properties. Very many photochromic coloring agents of this type are described in the literature and are commercially available.

Spiroxazine coloring agents, usable within the framework of the present invention have notably been described in the following patents: U.S. Pat. Nos. 3,562,175, 4,634,767, 4,637,968, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345 and in the applications EP-A-0 508 219, 0 232 295 and 0 171 909.

It is particularly recommended, within the framework of the present invention, the use of 1,3-dihydro-1,3,3-trimethyl-6'-(piperidino)spiro[2H-indole-2,3'-naphtho[2,1b][1,4]oxazine, referred to as SPO1 in the following examples (its developed formula is reproduced in said examples).

It is also recommended, within the framework of the present invention, the use of spiroxazines of formula:

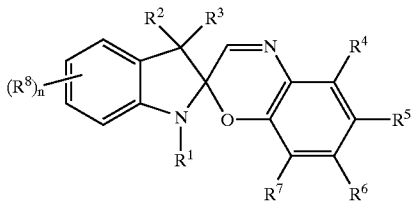

in which:

R₁ is a polycyclic group formed by at least one alicyclic group bound, bridged or condensed with at least one other aliphatic and/or aromatic ring, these cycles optionally containing at least one heteroatom and/or at least one unsaturation, R₂, R₃ are the same or different and represent a linear or branched alkyl group having from 1 to 12 carbon atoms, alkenyl, alkynyl, aryl, alkylaryl, cycloalkyl group; R₂ and R₃ can optionally be taken together to form a carbocyclic or heterocyclic group having from 5 to 10 atoms, R₄, R₅ R₆ and R₇ are the same or different and represent:
+ hydrogen
+ an alkyl, cycloalkyl, alkenyl, alkynyl, aryl, heteroaryl, aryloxy or aralkyl group, said group being optionally halogenated,
+ a halogen,
+ OR, —SR, —OCOR, —COOR, with R=H, alkyl and/or cycloalkyl and/or aryl,
+ a (poly)ether, a (poly)amide, a (poly)carbonate, a (poly)carbamate, a (poly)urea or a (poly)ester,
+* an amino radical giving rise, once bound in (I), to a primary, secondary or tertiary amine, said amine being mono- or di-substituted alkyl, aryl or aralkyl, according to its nature,
* or an aminocyclic radical containing optionally one or two heteroatoms,
+ or an electron-attracting group selected from the group comprising CF₃, CN, NO₂ and SCN,
+ at least two of the R₄, R₅ R₆ and R₇ radicals being optionally able to form together at least one aromatic ring having 5 or 6 members or an aliphatic ring having 5 to 7 members, said cycle(s) containing optionally at least one heteroatom, in such a way as to form at least one heterocyclic ring, the latter(s) being optionally substituted by one or more identical or different radicals, of the same definition as that given above for R₄ to R₇, n is a whole number and when n≧2, two of these R₈ radicals are optionally able to be taken together to form at least one aromatic or heteroaromatic ring;

and notably the use of one of the following spiroxazines: 1,3-dihydro-1-borny-3,3,4,6-tetramethylspiro [2H-indole-2,3'-3H-naphtho[2,1b][1,4] oxazine, referred to in the following examples as SPO2 (its developed formula is reproduced in said examples).

These spiroxazines, subject of the Application FR 9510221 of the Aug. 30, 1995, can be obtained by condensation of an indoline derivative substituted by a polycyclic group R₁ and with an aromatic nitrosoalcohol derivative like those described, for example, in the patents U.S. Pat. No. 3,578,602, U.S. Pat. No. 4,634,767, U.S. Pat. No. 4,913,544 and EP-A-600 669. This reaction can be carried out in solvent such as ethanol, toluene or dichloromethane.

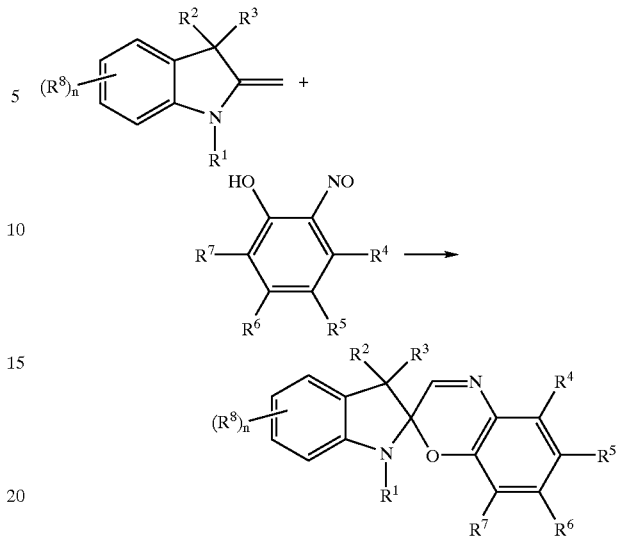

The indoline derivatives themselves are obtained by adapted literature methods.

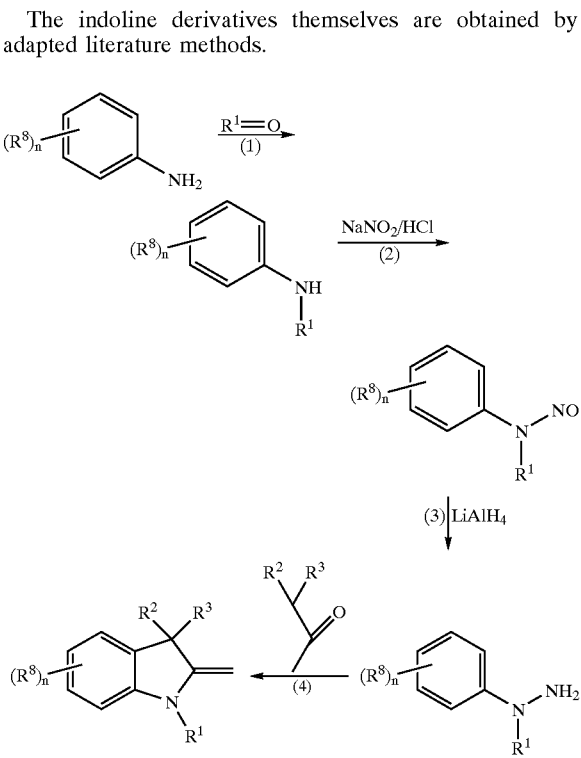

Step 1 is effected following a proceedure described in Katritzky et al., Tetrahedron, 1991, 47, 2683. The nitrosylation of the amine (step 2) is effected by a reaction with sodium nitrite-hydrochloric acid and the reduction of the nitroso derivative (step 3) is carried out by reaction with LiAl₄ in THF (Fridman et al., Russian Chemical Reviews, 1971, 40(1), 34). The last stepof the synthesis (4) is carried out by reaction of hydrazine with the appropriate ketone in an acidic medium, for example hydrochloric acid/ethanol or acetic acid (for a general review on this reaction, Robinson <<Fischer Indole Synthesis>> Wiley-Interscience, 1982, may be consulted).

Chromene coloring agents, usable within the framework of the present invention are notably described in the Patents U.S. Pat. Nos. 567,605, 4,889,413, 4,931,221, 5,200,116, 5,066,818, 5,224,602, 5,238,981, 5,106,998, 4,980,089, 5,130,058 and the Application EP-A-0 562 915. Said chromenes can consist notably of naphthopyrans.

It is recommended, particularly in the framework of the present invention, the use of 2,2-bis(4'-methoxyphenyl)-5, 6-dimethyl-2H-naphtho[1,2b]pyran referred to as CR1 in the following examples (its developed formula is reproduced in said examples).

Spiropyran coloring agents usable within the framework of the present invention are notably described in the following texts:

PHOTOCHROMISM G. Brown, Editor—Techniques of Chemistry—Wiley Interscience—Vol. III—1971—Chapter III—Pages 45–294—R. C. Bertelson.

PHOTOCHROMISM—Molecules & Systems—Edited by H. Durr—H. Bouas-Laurent—Elsevier 1990—Chapter 8: Spiropyranes—Pages 314–455—R. Gugliemetti.

The teachings in all these documents are incorporated here by way of reference.

Within the framework of the invention, the intervention of the spiroxazines and/or chromenes is generally preferred to those of spiropyrans, which possess a lower resistance to fatigue.

By way of illustration and in no way limiting, it is indicated here that said photochromic coloring agents intervene generally in the compositions to be polymerized (and polymerized compositions) of the invention at 0.01 to 1% by weight, advantageously at 0.05 to 0.5% by weight, with respect to the weight of the monomers.

It has been indicated that the compositions of the invention contain an effective quantity of at least one photochromic, coloring agent. It is in fact frequent, within the framework of the invention, to bring into intervention a combination of photochromic coloring agents, with the aim of obtaining the darkened state, a specified tint, notably grey or brown. In one particularly preferred implementation variant of the invention, the intervening photochromic charge comprises two spiroxazines and two chromenes.

Characteristically, the composition from which the photochromic organic material of the invention is elaborated contains at least one plasticizer. It is due to this intervention of such a plasticizer that the improved photochromic properties of said material have been able to be obtained. The Applicant has shown in a surprising way that the incorporation of plasticizers (in reasonable quantities) in polymerizable compositions based on monomers of formula (I) and (II) charged with photochromic coloring agent(s), has beneficial effects on the photochromic properties of said compositions without altering their mechanical properties. This is demonstrated by the results given in the following examples.

Said plasticizer—plasticizer for a polymerized matix based on compounds of formula (I) and (II)—can notably consist of triphenylphosphate or a phthalate. Advantageously, the composition from which is elaborated the material of the invention comprises at least one phthalate. Said phthalate is in principle selected from the saturated phthalates, advantageously sterically hindered, and the unsaturated phthalates; said saturated and unsaturated phthalates possessing one or two substituents.

When saturated phthalates—at least one saturated phthalate—intervenes in the structure of the material of the invention, they are not chemically bound to the polymer matrix insofar as where there are no monomers. They are dispersed in said matrix. It is understood while for the problems of stability, the intervention of sterically hindered phthalates is recommended.

Phthalates are listed below which contain two substituents which advantageously intervene, as plasticizer, in the polymerizable compositions from which the material of the invention is obtained. Said phthalates are listed in three sub-groups.

Linear phthalates: dialkylphthalates, whose identical or different alkyl groups contain generally from 1 to 12 carbon atoms (and can also contain a larger number of carbon atoms); and notably:
dimethylphthalate, diethylphthalate, dibutylphthalate, dihexylphthalate, diheptylphthalate, dioctyl(tere)phthalate, dinonylphthalate, diundecylphthalate, ditridecylphthalate, butyloctylphthalate, undecyl dodecylphthalate.

Hindered phthalates: dialkylphthalates, of the same type as those indicated above, in which at least one of the alkyl groups is branched; and notably:
diisobutylphthalate, diisoheptylphthalate, diisooctylphthalate, diisononylphthalate, diisodecylphthalate, di(2-ethylhexyl)phthalate, di(1-methylheptyl)phthalate,
or dialkylcycloalkylphthalates, dicycloalkylphthalates, dialkylphenylalkylphthalates and diphenylalkylphthalates (whose alkyl groups, as indicated above, contain generally from 1 to 12 carbon atoms); and notably: cyclohexyl isooctylphthalate, dicyclohexylphthalate, butylcyclohexylphthalate, butylbenzylphthalate;

Other phthalates: and notably phthalates substituted by alcoxy groups whose alkyl groups contain generally from 1 to 12 carbon atoms, such as: dimethoxyethylphthalate, dibutoxyethylphthalate, dibutoxyethoxyethylphthalate.

Within the framework of the present invention, it is particularly preferable to bring into intervention, as saturated phthalate, butylphthalate (DBP) and/or dioctylphthalate (DOP), notably in the form of dioctylterephthalate.

When unsaturated phthalates—at least one unsaturated phthalate—intervene in the structure of the material of the invention, they are bound chemically to the polymer matrix insofar as where their double bond(s) has (have) intervened during the radical polymerization. They have in fact intervened as a monomer. They are found therefore perfectly anchored, stabilized in the polymer matrix. It is most particularly recommended to bring into intervention as unsaturated phthalates, diallylphthalate.

The plasticizers which intervene in a characteristic way in the polymerizable composition from which the material of the invention is obtained, generally intervene at 1 to 10% by weight. If they intervene in too small a quantity, their beneficial action as to the photochromic properties do not manifest themselves. If they intervene in too great a quantity, their influence becomes harmful to the mechanical properties.

The nature and the quantities of intervention of the principal constituants of the polymerizable composition from which the novel photochromic organic material of the invention is obtained is specified above. It has already been indicated that other constituents intervene advantageously in this composition (compounds of formula (III) and/or (IV)) and that the polymerization reaction is generally carried out in the presence of an effective amount of at least one chain transfer agent and at least one radical polymerization initiator. These two aspects of the present invention are specified below.

Said polymerizable composition contains advantageously at least one compound (monomer) of formula (III). Said compound of formula (III) consists of divinylbenzne (DVB) or di(methylvinyl)benzene. Divinylbenzene (DVB) is the partciularly preferred compound of formula (III). The intervention of at least one compound of formula (III) is advantageous in that notably said compound moderates in a general way, the effects of the compound of formula (II). It has notably been demonstrated the beneficial action of such a compound of formula (III) on the expression of the photochromic properties. With reference to divinylbenzene, insofar as where this polymerized compound possesses a relatively high refractive index (n=1.61), its intervention is also beneficial in that it leads to an increase in the refractive index of the material of the invention.

It is recommended to bring into intervention said compound(s) of formula (III) at levels being able to attain 15% by weight. Higher than this, the beneficial effect is no longer observed: the mechanical effects of the material are altered and optical faults are generated. Said compound of formula (III) generally starts to express its beneficial action when it is employed at more than 2% by weight. Thus, it is recommended to generally bring it into intervention at between 2 and 15%, advantageously between 2 and 6% by weight.

The polymerizable composition advantageously contains also at least one compound (monomer) of formula (IV). These are (meth)acrylic monomers such as previously described. Notably, it can be butyl, pentyl, hexyl, heptyl, octyl or 2-ethylhexyl(meth)acrylate or even ethyl triglycol (meth)acrylate. 2-Ethylbexyl(meth)acrylate (MAEH) is the preferred compound of formula (IV). The presence of this type of compound is notably revealed to be advantageous for the turning-out of the polymerized material and for the implementation of the finishing treatments of the latter.

The intervention is generally limited to 20% by weight of this type of monomer whose presence has the disadvantage of decreasing the refractive index. The anticipated beneficial effect manifests itself generally from the intervention of a few percent by weight. It is recommended therefore generally to bring into intervention this type of compound at 4 to 15% by weight.

As specified above, the intervention of compounds of formula (III) and (IV) is not compulsory. It is navertheless generally advantageous. Thus, in the framework of the invention, it has been demonstrated a certain synergic effect, as concerns the photochromic properties of the plasticizer and the compound of formula (III).

The compounds of formula (I), (II), (III), (IV) are the principal constituents insofar as where they intervene or are susceptible of intervening in relatively consistent quantities—compositions from which the material of the invention is generated. Said material is obtained from said compounds—monomers—by a classical radical copolymerization. Said radical copolymerization is generally carried out as specified above in the presence of an effective amount of at least one chain transfer agent and at least one radical polymerization initiator.

The chain transfer agent generally intervenes at a maximal level of 5% by weight, advantageously at 0.01 to 2% by weight, with respect to the weight of the monomers to be polymerized. It is noted here that it is possible to do away with the presence of such a chain transfer agent in the hypothesis where the material is prepared under a reduced thickness (e≦2.0 mm). In this hypothesis, one is not confronted with problems of heat evacuation . . . For the preparation of a material of the invention possessing a thickness of greater than 2.0 mm, the presence of a chain transfer agent, in the quantities indicated above is almost compulsory. It is very much inadvisable to go beyond the maximal level of 5% indicated above since the glass transition temperature of the material prepared bcomes much too low. It is highly recommended, for the preparation of material (lens) of a thickness ranging from 1.5 to 20 mm, a level of chain transfer agent of about 0.9%. It is noted that the colorability and the kinetics of darkening of the material of the invention increase with the quantity of intervening chain transfer agent. In the same way, when this quantity increases, the mechanical resistance increases, and the optical qualities improve . . .

It is obviously convenient that said chain transfer agent should not destroy the photochromic coloring agent(s) present during the polymerization and/or should not induce in their proper way a decoloration of the material. Such harmful phenomena have been noted by the Applicant when halogenated chain transfer agents have been employed. It is recommended therefore to bring into intervention within the framework of the invention non-halogenated chain transfer agents.

It is particularly recommended to bring into intervention at least one chain transfer agent (non-halogenated) selected from the linear alkanethiols and bis-mercapto-ethyl ether. Said linear alkanethiols contain generally from 2 to 18 carbon atoms, advantageously from 4 to 16 carbon atoms. Specific examples of such linear alkanethiols are butanethiol, pentanethiol, hexanethiol, heptanthiol, octanthiol, decanethiol, dodecanethiol and tetradecanethiol.

The use of dodecanethiol is highly recommended.

It is not excluded to use other types of chain transfer agents such as alkanethiols (of the above type) substituted by at least one aryl or alkyl radical or thiophenols.

Concerning bis-mercaptoethyl ether, its formula is specified for its usefulness:

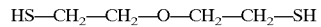

All these compounds are familiar to the person skilled in the art and are commercially available.

The radical polymerization initiator or catalyst intervening must, itself also, be inert towards the photochromic colorant(s) present. This is why the Applicant recommends not to use peroxide-type initiators. The Applicant recommends the use of radical polymerization initiator(s) selected from the diazo compounds. These compounds are familiar to the person skilled in the art and are commercially available. Examples of such diazo compounds are azobisisobutyronitrile (AIBN) and 2,2'-azobis(2-methylbutyronitrile) (AMBN), the latter being preferred. The catalyst is generally used at 0.01 to 1% by weight, preferably at 0.05 to 0.5% by weight, with respect to the weight of the monomers present. In the absence of such a catalyst or in the presence of too weak a quantity of this, it becomes necessary to carry out the copolymerization at a higher temperature and this renders the reaction difficult to control . . . In the presence of too great a quantity of catalyst, an excess of free radicals may be generated, this excess of free radicals inducing a destruction of the photochromic colorant(s) present and a fatigue of the final material. In this last hypothesis, the reaction carried out can also accelerate and become difficult to control.

The Applicant has noted that the combination chain transfer agent of alkanethiol type/polymerization initiator of diazo type allows obtaining photochromic materials which exhibit excellent photochromic properties.

The materials of the invention, such as described above—obtainable by radical polymerization of a composition containing the ingredients specified above—are photochromic transparent organic materials. It is not excluded from the framework of the present invention to bring into intervention in said composition to be polymerized an effective quantity of at least one non-photochromic coloring agent in such a way that the material, resulting from the polymerization possesses a fixed base tint.

This type of non-photochromic coloring agent is known to the person skilled in the art. Its intervention does not give rise to any particular problem.

It is furthermore noted that it is not excluded that said composition contains other types of additives, known for having a beneficial action on this type of compositions and notably that it contains stabilizers of the HALS type (Hindered Amine Light Stabilizers). These compounds, described in the patent application EP-A-0 195 898, would be photostabilizers and would have the property to increase the resistance to fatigue (to light) of a photochromic composition based on spiroxazines. Their intervention in reasonable quantities in the compositions of the invention containing as coloring agent at least one spiroxazine is therefore also recommended. It is highly inadvisable to bring into intervention more than 2% by weight of such compounds, insofar as where they make an obstacle to the copolymerization reaction. They intervene generally at levels of less than or equal to 0.5% by weight.

The compositions of the invention can also contain an additive of the UV absorber type, such as, for example 2-(2H-benzotriazol-2-yl)-4-methyl-phenol (product marketed under the brand name of TINUVIN P).

According to another of its aims, the present invention relates to the use of at least one plasticizer for the preparation of photochromic organic materials with improved photochromic properties. Said plasticizer can notably consist, as indicated higher in the present text, of triphenylphosphate or a phthalate. The use of phthalates, and notably that of phthalates expressly mentioned above is generally preferred. Up to the present time, to the knowledge of the Applicant, this property of the plasticizer is novel and totally unexpected. The intervening plasticizers are dispersed in the polymer matrix or advantageously bound chemically to the polymer matrix.

According to another of its aims, the present invention relates to a process for the preparation of photochromic organic materials such as described above. Said process comprises the radical polymerization of a composition including:

(a) at least one monomer of formula (I), such as defined above;
(b) at least one aromatic monovinylic monomer of formula (II), such as defined above;
(c) an effective amount of at least one photochromic coloring agent, such as defined above;
(d) at least one plasticizer such as defined above;
(g) advantageously, an effective amount of at least one chain transfer agent, such as defined above (it has been seen that one is able to do without the intervention of such an agent in the hypothesis where one prepares a block of material of low thickness: $e \leq 2.0$ mm);
(h) an effective amount of at least one radical polymerization initiator such as defined above;
and including, further, optionally (advantageously):
(e) at least one aromatic divinylic monomer of formula (III), such as defined above; and/or
(f) at least one (meth)acrylic monomer of formula (IV), such as defined above.

Said composition can furthermore contain, as indicated above, various additives and notably at least one non-photochromic coloring agent.

The polymerization carried out is a copolymerization bringing into intervention at least two types of monomers (of formula (I) and (II)). It can bring into intervention up to five types of monomers (of formula (I), (II), (III), (IV)+a plasticizer possessing at least one double bond);

Said copolymerization is carried out on the composition which contains all the ingredients, including the photochromic coloring agent(s) (and optionally non-photochromic, see above).

Said copolymerization is carried out under the conditions which are familiar to the person skilled in the art.

According to its last aim, the invention relates to photochromic articles, constituted wholly or in part of a photochromic organic material of the invention. Non-limiting examples of such articles are ophthalmic corrective lenses, solar lenses (the material includes a non-photochromic coloring agent), glazing for vehicles and buildings . . . In these articles, the photochromic material of the invention can constitute any thickness of the article (mass article) or constitute a film or stratified layer applied on a support.

The ophthalmic lenses are the preferred artciles and can be comfortably produced by carrying out the copolymerization for example, in the patents U.S. Pat. Nos. 2,242,386 3,136,000 or 3,881,683.

The invention is illustrated by the Examples 3–6, 8–14, 17–19 given below. Examples 1, 2, 7, 15 and 16 are given by way of comparison. They relate to reference compositions which do not contain a plasticizer in their formulation. All the proportions indicated in said Examples 1 to 19 are by weight. Test-tubes of 2 mm thickness were in fact prepared and have been tested in order to evaluate the photochromic and mechanical properties of the material. Said test-tubes were obtained by carrying out a polymerization of the polymerizable composition, in an suitable mould, under the following conditions: said polymerizable composition is slowly heated until the beginning of the thermal degradation of the catalyst (radical polymerization initiator), this degradation generating free radicals. Once the temperature of 53° C. is attained, it is maintained for 16 hours. After this period of 16 hours, the temperature is brought to 90° C. over 3 hours. This temperature of 90° C. is then maintained for 2 hours. After this thermal treatment, the test-tubes of material to be tested are turned out of the moulds.

It is noted that the thermal treatment specified below is that carried out by the Applicant in order to obtain ophthalmic lenses from polymerizable compositions of the invention, treated in lens moulds.

The starting materials used in the Examples are the following:

| Monomers | |
|---|---|
| Diacryl 121 of Akzo Chemical | DIA |
| Styrene | STY |
| Divinylbenzene | DVB |
| 2-ethylhexyl methacrylate | MAEH |
| Plasticizer | |
| Diallyl phthalate (monomer) | DAP |
| Dibutyl phthalate | DBP |
| Catalyst (radical polymerization catalyst) | |
| 2,2'-azobis 2-methylbutyronitrile | AMBN |
| Chain transfer agent | |
| 1-dodecanethiol | DDT |

| Photochromic coloring agent | | |
|---|---|---|
| Chemical type | Manufacturer | Designation |
| Spiroxazine | James Robinson | SPO1* |
| Spiroxazine | Flamel Technologies | SPO2** |
| Chromene (naphthopyran) | James Robinson | CR1*** |

*SPO1: 1,3-dihydro-1,3,3-trimethyl-6'-(piperidino)spiro[2H-indole-2,3'-3H-naphtho[2,1b][1,4]oxazine]

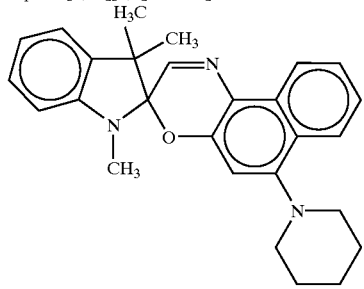

**SPO2: 1,3-dihydro-1-bornyl-3,3,4,6-tetromethylspiro[2H-indole-2,3'-3H-naphtho[2,1b][1,4]oxazine]

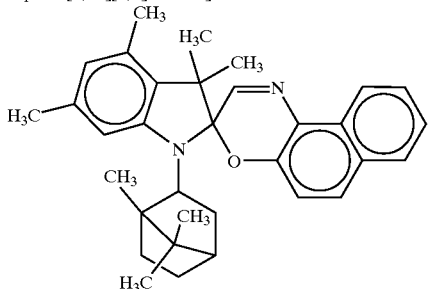

***CR1: 2,2-bis(4'-methoxyphenyl)-5,6-dimethyl-2H-naphtho[1,2b]pyran

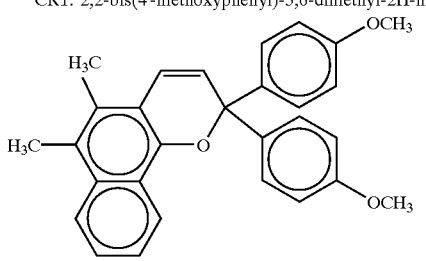

The test-tubes of material according to the invention (Examples 3–6, 8–14 and 17–19) have been prepared as well as those of material which does not include a plasticizer (Examples 1, 2, 7, 15 and 16) by polymerizing, under the conditions given above, polymerizable compositions whose formulations are specified in the Tables given below.

The photochromic properties of the materials obtained have been evaluated by means of the measurement of two parameters:

the colorability=$OD_{15}-OD_0$; evolution of the optical density of a normalized sample (of 2 mm thickness). Said sample, whose optical density has been measured $OD_0$, (before exposure), is exposed for 15 minutes under a xenon lamp (40 000 lux). After this 15 minute period, the new optical density $OD_{15}$ of said darkened sample is measured. The measurement is effected at the maximal absorption wavelength of the coloring agent; i. e. 560 nm for SPO1, 620 nm for SPO2 and 504 nm for CR1. The colorability or amount of darkening is quantified by the absolute value of the difference of said optical densities $OD_{15}$ and $OD_0$;

The half-darkening time: $t_{1/2}$ (s); which characterizes the kinetics of the return to the initial state. After the 15 minutes period of exposure under the above conditions ($OD_{15}$), said exposure is cut and the time necessary for a return to $$\frac{OD_{15} - OD_0}{2}$$

is timed; this is $t_{1/2}$.

The mechanical properties of the materials obtained were evaluated by means of the measurement of two parameters:

the glass transition temperature, determined by measuring the tangent maximum δ: Tg (max, tg δ) (° C.). Said temperature is determined by dynamic mechanical analysis (DMA). This parameter and its method of measurement are familiar to the person skilled in the art;

the elasticity modulus E' (GPa) measured at 25° C. and at 100° C. (at the rubber plateau).

The person skilled in the art knows that, for a thermo-reticulated polymer such as desired for ophthalmic applications, a Tg>100° C., a high E' at 25° C. and an E' at 100° C. which is not too low, are all necessary; said E' at 100° C. representing the softening aptitude of the lens during polishing or cutting-out, during the placing in the frame.

TABLE 1

| | Ex. 1 | Ex. 2 | Ex. 3 | Ex. 4 | Ex. 5 | Ex. 6 |
|---|---|---|---|---|---|---|
| Formulation | | | | | | |
| DIA | 88.9 | 84.4 | 84.4 | 84.4 | 84.4 | 84.4 |
| STY | 10 | 9.5 | 9.5 | 9.5 | 9.5 | 9.5 |
| DVB | — | 5.0 | — | 1.25 | 2.5 | 3.75 |
| MAEH | — | — | — | — | — | — |
| DAP | — | — | 5.0 | 3.75 | 2.5 | 1.25 |
| DBP | — | — | — | — | — | — |
| AMBN | 0.2 | 0.2 | 0.2 | 0.2 | 0.2 | 0.2 |
| DDT | 0.9 | 0.9 | 0.9 | 0.9 | 0.9 | 0.9 |
| SPO1 | 0.02 | 0.02 | 0.02 | 0.02 | 0.02 | 0.02 |
| SPO2 | — | — | — | — | — | — |
| CR1 | — | — | — | — | — | — |
| Photochromic properties | | | | | | |
| Colorability | 0.627 | 0.759 | 0.949 | 1.068 | 1.048 | 0.975 |
| $t_{1/2}$ lightening | 49 | 29 | 23 | 20 | 19 | 21 |
| Mechanical properties | | | | | | |
| Tg (max tg δ) (° C.) | 120 | 128 | 110 | 104 | 108 | 115 |
| E (25° C.) (GPa) | 2.5 | 2.73 | 2.53 | 2.67 | 2.6 | 2.67 |
| E' (100° C.) (GPa) | 0.76 | 0.83 | 0.3 | 0.18 | 0.26 | 0.42 |

TABLE 2

| | Ex. 7 | Ex. 8 | Ex. 9 | Ex. 10 |
|---|---|---|---|---|
| Formulation | | | | |
| DIA | 62.4 | 60.8 | 59.3 | 56.2 |
| STY | 19.4 | 18.9 | 18.4 | 17.4 |
| DVB | 4.0 | 3.9 | 3.8 | 3.6 |
| MAEH | 13.0 | 12.7 | 12.4 | 11.7 |
| DAP | — | 2.5 | 5.0 | 10.0 |
| DBP | — | — | — | — |
| AMBN | 0.2 | 0.2 | 0.2 | 0.2 |

TABLE 2-continued

|  | Ex. 7 | Ex. 8 | Ex. 9 | Ex. 10 |
|---|---|---|---|---|
| DDT | 0.9 | 0.9 | 0.9 | 0.9 |
| SPO1 | 0.153 | 0.153 | 0.153 | 0.153 |
| SPO2 | — | — | — | — |
| CR1 | — | — | — | — |
| Photochromic properties |  |  |  |  |
| Colorability | 1.236 | 1.367 | 1.538 | 1.487 |
| $t_{1/2}$ lightening | 77 | 45 | 30 | 18 |
| Mechanical properties |  |  |  |  |
| Tg (max tg δ) (° C.) | 122 | 115 | 107 | 94 |
| E (25° C.) (GPa) | 2.37 | 2.47 | 2.37 | 2.27 |
| E' (100° C.) (GPa) | 0.87 | 0.54 | 0.29 | 0.09 |

Concerning the results given in said Tables, the following remarks can be made.

Examples 1 to 6 (Table 1)

The results show the beneficial effect of DAP, on the kinetics of the photochromic process as well as on the intensity of this (the colorability). The comparison of Examples 4 to 6 (DAP+DVB) to Examples 2 (DVB alone) and 3 (DPA alone) demonstrate a certain synergy.

Example 1 shows clearly the mediocre photochromic properties of a formulation that contains neither DVB nor DAP.

The formulation in Example 2 exhibits an E' at 100° C. which appears too high. With such an E', the risk of breakage in the <<drop ball test>> is real.

It is nevertheless interesting, in Example 6, to have been able to obtain a value of E' at 100° C. sufficiently high without it being detrimental to the photochromic performances.

Examples 7 to 10 (Table 2)

The formulations of said Examples including MAET. With a constant DVB/STY ratio, the effect of increasing the levels of DAP on the photochromic and mechanical properties are demonstrated.

Examples 11 to 14 (Table 3)

Another spiroxazine intervenes as photochromic coloring agent in the formulations of Examples 11 to 13. The mechanical properties of the formulations prepared were not measured. Replacing SPO1 by SPO2 does not have an influence at their level. Said mechanical properties of the materials according to Examples 11 to 13 are very close indeed to those of the materials according to Examples 3 to 6.

Example 14 illustrates the use of a plasticizer which is not bound to the matrix (dibutyl phthalate).

Examples 15 to 19 (Table 4)

A coloring agent of the chromene type is used. The mechanical properties of the formulations prepared have not been measured. For the reasons indicated in the previous paragraph, said mechanical properties of the materials according to examples 15 to 19 are indeed very close to those of the materials according to examples 3 to 6

Example 15 shows clearly the mediocre photochromic properties of a formulation which includes neither DVB nor plasticizer. Example 16 shows the beneficial effect of the intervention of DVB, Example 19 shows the even more beneficial effect of the action of DAP.

Example 18 demonstrates the synergic effect concerning the colorability; this synergic effect can be found in other formulations concerning the kinetics of lightening.

What is claimed is:

1. Photochromic organic material obtained by radical polymerization of a composition comprising:

(a) at least one monomer of formula (I):

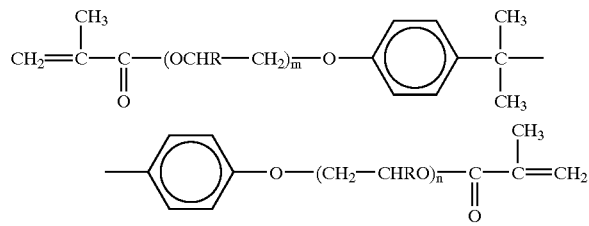

in which R=H or $CH_3$ and m and n are independently 1 or 2;

(b) at least one aromatic monovinyl monomer of formula (II):

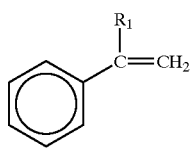

in which $R_1$=H or $CH_3$;

(c) an amount of at least one photochromic coloring agent effective to confer photochromic properties to said material; said coloring agent being selected from the group consisting of spiroxazines, spiropyrans, and chromenes; and (d) at least one plasticizer, wherein said plasticizer (d) is an unsaturated phthalate.

2. The material according to claim 1, wherein said composition further comprises:

(e) at least one aromatic divinyl monomer of formula (III):

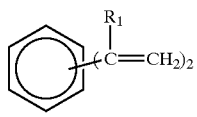

in which $R_1$=H or $CH_3$.

3. The material according to claim 1, wherein said composition further comprises:

(f) at least one (meth)acrylic monomer of formula (IV):

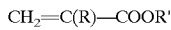

$$CH_2=C(R)-COOR'$$

in which R=H or $CH_3$ and R' is a straight-chain or branched alkyl radical having from 4 to 16 carbon atoms, an optionally substituted methylphenyl or methylphenoxy radical, or a polyoxyethoxylated group with formula —$(CH_2-CH_2O)_n$ R" in which n=1 to 10 and R"=$CH_3$ or $C_2H_5$.

4. The material according to claim 1, wherein said composition further comprises an effective amount of at least one non-halogenated chain transfer agent.

5. The material according to claim 1, wherein said composition further comprises an effective amount of at least one radical polymerization initiator of the diazo type.

6. The material according to claim 1, wherein said composition further comprises an effective amount of at least one non-photochromic coloring agent.

7. Photochromic organic material obtained by radical polymerization of a composition comprising:

(a) at least one monomer of formula (I):

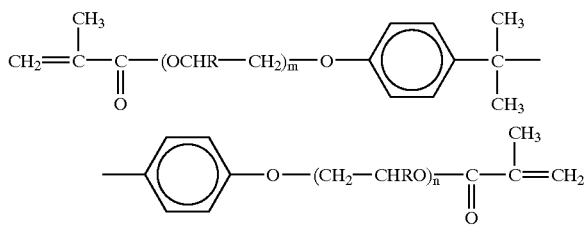

in which R=H or $CH_3$ and m and n are independently 1 or 2;

(b) at least one aromatic monovinyl monomer of formula (II):

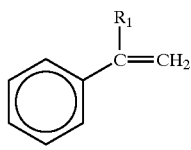

in which $R_1$=H or $CH_3$;

(c) an amount of at least one photochromic coloring agent effective to confer photochromic properties to said material; said coloring agent being selected from the group consisting of spiroxazines, spiropyrans, and chromenes; and (d) at least one plasticizer, wherein said plasticizer (d) is a diallylphthalate.

8. The material according to claim 1, wherein said composition comprises about:

50 to 90% by weight of at least one monomer (a) of formula (I);

5 to 40% by weight of at least one monomer (b) of formula (II);

0.1 to 10% by weight of at least one plasticizer (d);

0 to 15% by weight of at least one aromatic divinyl monomer of formula (III):

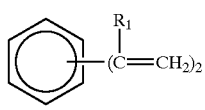

in which $R_1$=H or $CH_3$; and 0 to 20% by weight of at least one (meth)acrylic monomer of formula (IV):

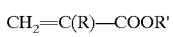

in which R=H or $CH_3$ and R' is a straight-chain or branched alkyl radical having from 14 to 16 carbon atoms, an optionally substituted methylphenyl or methylphenoxy radical or polyoxyethoxylated group with formula $-(CH_2-CH_2O)_n R''$ in which n=1 to 10 and R''=$CH_3$ or $C_2H_5$.

9. Process for the preparation of photochromic organic materials, said process comprising radically polymerizing a composition which comprises:

(a) at least one monomer of formula (I):

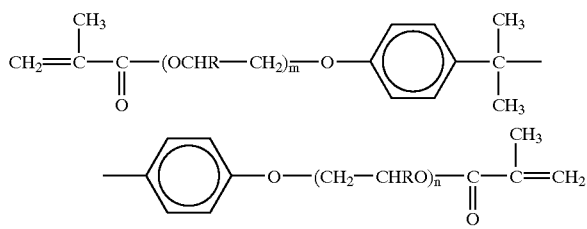

in which R=H or $CH_3$ and m and n are independently 1 or 2;

(b) at least one aromatic monovinyl monomer of formula (II):

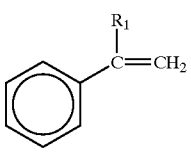

in which $R_1$=H or $CH_3$;

(c) an amount of at least one photochromic coloring agent effective to confer photochromic properties to said material; the coloring agent being selected from the group consisting of spiroxazines, spiropyrans, and chromenes; and (d) at least one plasticizer, wherein said plasticizer (d) is an unsaturated phthalate;

(g) optionally, an effective quantity of at least one non-halogenated chain transfer agent; and (h) an effective quantity of at least one radical polymerization initiator of the diazo type.

10. Process according to claim 9, wherein the composition further comprises:

(e) at least one aromatic divinyl monomer of formula (III):

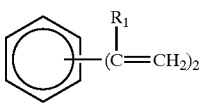

in which $R_1$=H or $CH_3$, and/or (f) at least one (meth)acrylic monomer of formula (IV):

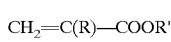

in which R=H or $CH_3$ and R' is a linear or branched alkyl radical having from 4 to 16 carbon atoms, an optionally substituted methylphenyl or methylphenoxy radical, or a polyoxyethoxylated group of formula $-(CH_2-CH_2O)_n R''$ in which n=1 to 10 and R''=$CH_3$ or $C_2H_5$.

11. A photochromic article comprising a photochromic material according to claim 1.

12. Article according to claim 11, wherein said article is an ophthalmic or solar lens.

13. Article according to claim 11, wherein said article is a glazing for vehicles or buildings.

14. The material according to claim 1, wherein said at least one aromatic monovinyl monomer of formula (II) is styrene.

15. The material according to claim 2, wherein said at least one aromatic divinyl monomer of formula (III) is divinyl benzene.

16. The material according to claim 3, wherein said at least one (meth)acrylic monomer of formula (IV) is ethylhexylmethacrylate.

17. The material according to claim 4, wherein said at least one non-halogenated chain transfer agent is selected from the group consisting of straight chain alkanethiols and bis-mercapto-ethylether.

18. The material according to claim 17, wherein or said at least one non-halogenated chain transfer agent is dodecanethiol.

19. The material according to claim 5, wherein said at least one radical polymerization initiator is 2,2'-azobis(2-methylbutyronitrile).

20. A photochromic article comprising a photochromic material according to claim 2.

21. Article according to claim 20, wherein said article is selected from the group consisting of an ophthalmic lens, a solar lens, a glazing for vehicles, and a glazing for buildings.

22. A photochromic article comprising a photochromic material according to claim 10.

23. Article according to claim 22, wherein said article is selected from the group consisting of an ophthalmic lens, a solar lens, a glazing for vehicles, and a glazing for buildings.

24. The material according to claim 2, wherein said composition further comprises:

(f) at least one (meth)acrylic monomer of formula (IV):

$$CH_2=C(R)-COOR'$$

in which R=H or $CH_3$ and R' is a straight-chain or branched alkyl radical having from 4 to 16 carbon atoms, an optionally substituted methylphenyl or methylphenoxy radical, or a polyoxyethoxylated group with formula $-(CH_2-CH_2O)_n R''$ in which n=1 to 10 and R''=$CH_3$ or $C_2H_5$.

25. The material according to claim 24, wherein said at least one (meth)acrylic monomer of formula (IV) is ethylhexylmethacrylate.

26. The material according to claim 2, wherein said composition further comprises an effective amount of at least one non-halogenated chain transfer agent.

27. The material according to claim 26, wherein said at least one non-halogenated chain transfer agent is selected from the group consisting of straight chain alkanethiols and bis-mercapto-ethylether.

28. The material according to claim 26, wherein said at least one non-halogenated chain transfer agent is dodecanethiol.

29. The material according to claim 3, wherein said composition further comprises an effective amount of at least one non-halogenated chain transfer agent.

30. The material according to claim 29, wherein said at least one non-halogenated chain transfer agent is selected from the group consisting of straight chain alkanethiols and bis-mercapto-ethylether.

31. The material according to claim 29, wherein said at least one non-halogenated chain transfer agent is dodecanethiol.

32. The material according to claim 24, wherein said composition further comprises an effective amount of at least one non-halogenated chain transfer agent.

33. The material according to claim 32, wherein said at least one non-halogenated chain transfer agent is selected from the group consisting of straight chain alkanethiols and bis-mercapto-ethylether.

34. The material according to claim 32, wherein said at least one non-halogenated chain transfer agent is dodecanethiol.

35. The material according to claim 1, wherein said composition comprises from about 0.1 to about 10% by weight of said at least one plasticizer (d).

36. The material according to claim 1, wherein said plasticizer (d) is a sterically hindered saturated phthalate.

37. The material according to claim 2, wherein said composition comprises from about 0.1 to about 10% by weight of said at least one plasticizer (d).

38. The material according to claim 2, wherein said plasticizer (d) is a sterically hindered saturated phthalate.

39. The material according to claim 3, wherein said plasticizer (d) is a saturated phthalate.

40. The material according to claim 3, wherein said plasticizer (d) is a sterically hindered saturated phthalate.

41. The material according to claim 24, wherein said plasticizer (d) is a saturated phthalate.

42. The material according to claim 24, wherein said plasticizer (d) is a sterically hindered saturated phthalate.

43. The material according to claim 4, wherein said plasticizer (d) is a diallylphthalate.

44. The material according to claim 5, wherein said plasticizer (d) is a diallylphthalate.

45. The material according to claim 6, wherein said plasticizer (d) is a diallylphthalate.

46. The material according to claim 8, wherein said plasticizer (d) is a diallylphthalate.

47. Composition comprising:

(a) at least one monomer of formula (I):

in which R=H or $CH_3$ and m and n are independently 1 or 2;

(b) at least one aromatic monovinyl monomer of formula (II):

in which $R_1$=H or $CH_3$;

(c) an amount of at least one photochromic coloring agent effective to confer photochromic properties to said material; said coloring agent being selected from the group consisting of spiroxazines, spiropyrans, and chromenes; and (d) at least one plasticizer, wherein said plasticizer (d) is an unsaturated phthalate.

48. The composition according to claim 47, wherein said composition further comprises:

(e) at least one aromatic divinyl monomer of formula (III):

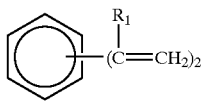

in which $R_1$=H or $CH_3$.

49. The composition according to claim 47, wherein said composition further comprises:
   (f) at least one (meth)acrylic monomer of formula (IV):

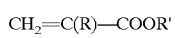

in which R=H or $CH_3$ and R' is a straight-chain or branched alkyl radical having from 4 to 16 carbon atoms, an optionally substituted methylphenyl or methylphenoxy radical, or a polyoxyethoxylated group with formula —$(CH_2'CH_2O)_n$ R" in n=1 to 10 and R"=$CH_3$ or $C_2H_5$.

50. The composition according to claim 47, wherein said composition further comprises a effective amount of at least one non-halogenated chain transfer agent.

51. The composition according to claim 47, wherein said composition further comprises an effective amount of at least one radical polymerization initiator of the diazo type.

52. The composition according to claim 47, wherein said composition further comprises an effective amount of at least one non-photochromic coloring agent.

53. The composition according to claim 47, wherein said plasticizer (d) is a diallylphthalate.

54. The composition according to claim 47, wherein said composition comprises about:
   50 to 90% by weight of at least one monomer (a) of formula (I);
   5 to 40% by weight of at least one monomer (b) of formula (II);
   0.1 to 10% by weight of at least one plasticizer (d);
   0 to 15% by weight of at least one aromatic divinyl monomer of formula (III):

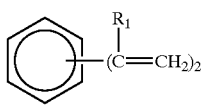

in which $R_1$=H or $CH_3$; and
   0 to 20% by weight of at least one (meth)acrylic monomer of formula (IV):

in which R=H or $CH_3$ and R' is a straight-chain or branched alkyl radical having from 14 to 16 carbon atoms, an optionally substituted methylphenyl or methylphenoxy radical or polyoxyethoxylated group with formula —$(CH_2$—$CH_2O)_nR"$ in which n=1 to 10 and R"=$CH_3$ or $C_2H_5$.

55. Composition comprising:
   (a) at least one monomer of formula (I):

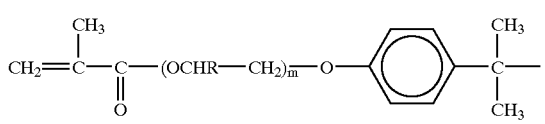

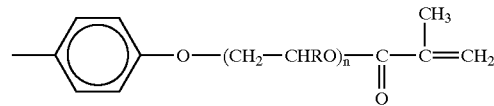

in which R=H or $CH_3$ and m and n are independently 1 or 2;

(b) at least one aromatic monovinyl monomer of formula (II):

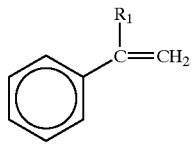

in which $R_1$=H or $CH_3$;

(c) an amount of at least one photochromic coloring agent effective to confer photochromic properties to said material; said coloring agent being selected from the group consisting of spiroxazines, spiropyrans, and chromenes; and (d) at least one plasticizer, wherein said plasticizer (d) is a triphenylphosphate.

56. The composition according to claim 55, wherein said composition further comprises:
   (f) at least one (meth)acrylic monomer of formula (IV):

in which R=H or $CH_3$ and R' is a straight-chain or branched alkyl radical having from 4 to 16 carbon atoms, an optionally substituted methylphenyl or methylphenoxy radical, or a polyoxyethoxylated group with formula —$(CH_2$—$CH_2O)_n$ R" in which n=1 to 10 and R"=$CH_3$ or $C_2H_5$.

57. The composition according to claim 55, wherein said composition further comprises an effective amount of at least one non-halogenated chain transfer agent.

58. The composition according to claim 55, wherein said composition further comprises an effective amount of at least one radical polymerization initiator of the diazo type.

59. The composition according to claim 55, wherein said composition further comprises an effective amount of at least one non-photochromic coloring agent.

60. The composition according to claim 55, wherein said composition comprises about:
   50 to 90% by weight of at least one monomer (a) of formula (I);
   5 to 40% by weight of at least one monomer (b) of formula (II);
   0.1 to 10% by weight of at least one plasticizer (d);
   0 to 15% by weight of at least one aromatic divinyl monomer of formula (III):

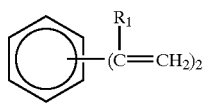

in which $R_1$=H or $CH_3$; and 0 to 20% by weight of at least one (meth)acrylic monomer of formula (IV):

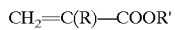
$CH_2=C(R)-COOR'$ in which R=H or $CH_3$ and R' is a straight-chain or branched alkyl radical having from 14 to 16 carbon atoms, an optionally substituted methylphenyl or methylphenoxy radical or polyoxyethoxylated group with formula $-(CH_2-CH_2O)_n R''$ in which n=1 to 10 and $R''=CH_3$ or $C_2H_5$.

61. Photochromic organic obtained by radical polymerization of a composition according to claim 55.

* * * * *